UNITED STATES PATENT OFFICE.

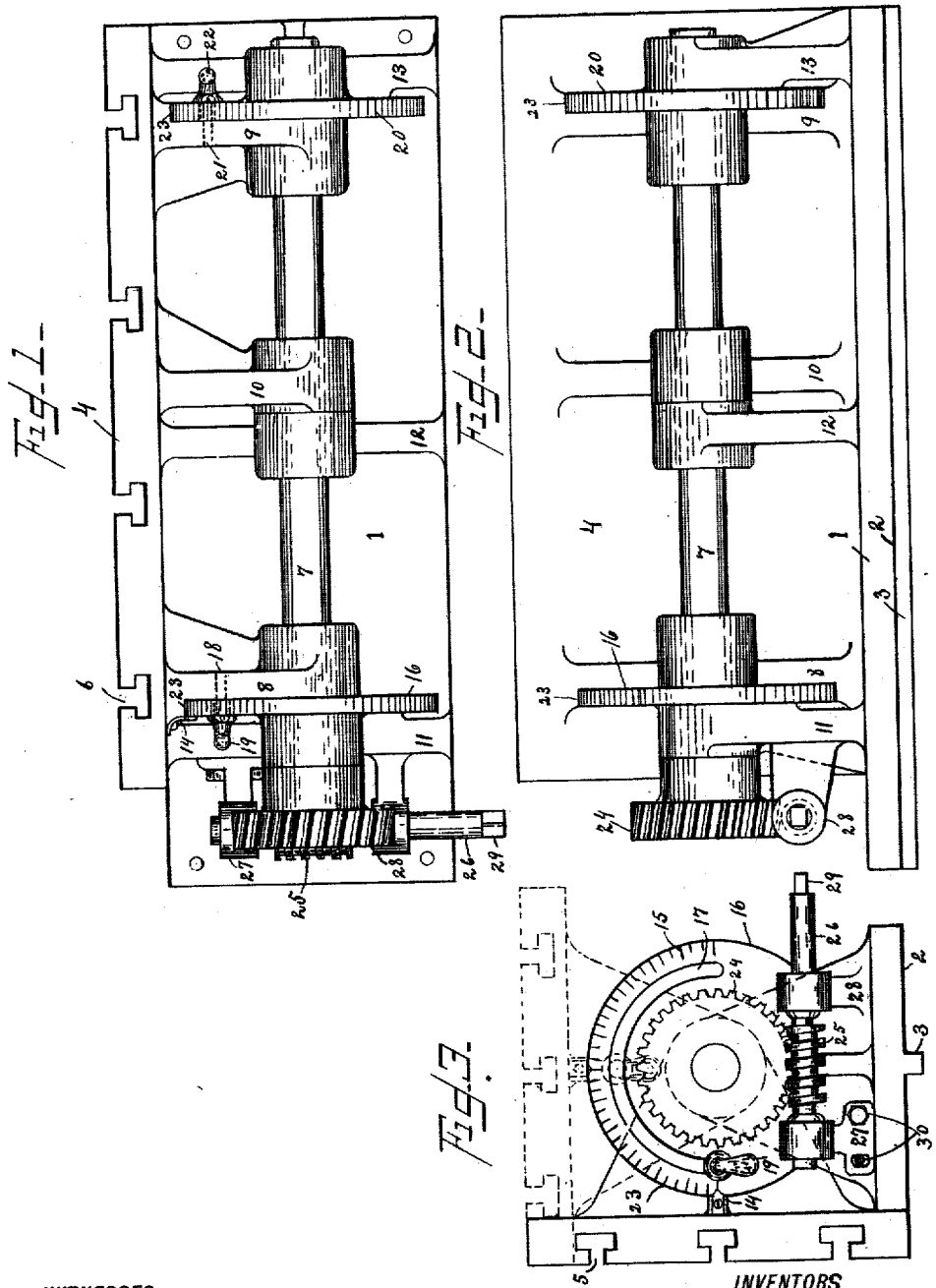

ADAM FERTIG AND RICHARD T. KNOLL, OF NEW YORK, N. Y.

WORK-HOLDING ATTACHMENT.

No. 814,366.  Specification of Letters Patent.  Patented March 6, 1906.

Application filed April 1, 1904. Serial No. 201,065.

*To all whom it may concern:*

Be it known that we, ADAM FERTIG and RICHARD T. KNOLL, citizens of the United States, residing in Manhattan borough, city of New York, county of New York, and State of New York, have invented a certain new and useful Work-Holding Attachment, of which the following is a specification.

This invention relates to means for holding the work upon the beds or platens of planing-machines, milling-machines, shaping-machines, &c.

The principal object of the invention is to increase the efficiency of work-holding attachments of this character and enlarge the scope of their operations.

Heretofore it has been proposed to pivot two plates together, secure one of them to the bed of a planer or the like, and then secure the work upon the other plate, so that the work may be adjusted to different angles. By our invention the work-holding plate is so mounted that it may be swung to either side of the bed-plate and stand at right angles therewith or to a position overlying said plate and parallel therewith or to any intermediate position, the work-holding plate always standing or lying wholly outside of the bed-plate, so as to permit freedom of movement of the shaping or cutting tool which acts upon the work. Thus a piece of work may be machined upon three sides at right angles to each other when desired simply by adjusting the work-holding plate. Holes may also be drilled in the work at right angles to one another. It is usual in attachments of this kind to employ a square, bevel, or other instrument in order to set the work-holding plate to the proper angle; but by our invention this objection is overcome and it is rendered practicable to handle the work and set it with precision and without loss of time. Again, our work-holder may be used with facility in planing or cutting a cylindrical contour upon the work or in making a tapering cut and without the necessity of loosening the work-holder from the machine or the work from the work-holder.

In the accompanying drawings, Figure 1 is a plan, Fig. 2 a side elevation, and Fig. 3 an end elevation, of a work-holding attachment constructed in accordance with our invention. In these figures the work-holding plate is illustrated as standing at right angles with the base; but at Fig. 3 the work-holding plate is shown in dotted lines as turned to a position parallel with the base-plate or bed.

In the views like parts are identified by like signs.

The invention comprises two main parts hinged together—viz., a base-plate or bed 1, having a plane bottom 2 for resting upon the bed of a machine, and preferably a central guide-rib 3 for insertion into the grooves usually provided in the machine-bed and a work-holding plate 4, having T-grooves, some extending longitudinally of the plate, as at 5, and others transversely thereof, as at 6, said grooves being of ordinary type and adapted to retain the clamps, whereby the work may be held upon the work-holding plate. Said main parts are hinged together by means of a longitudinal shaft or pintle 7, preferably fixed in bearings cast upon the work-holding plate 4, three such bearings being shown in this instance, two at the ends of the plate and designated as 8 and 9 and one intermediate bearing 10. The shaft 7 turns in bearings 11, 12, and 13, cast upon the base-plate 1, the bearings 11 and 13 confining bearings 8 and 9 to prevent endwise play of the work-holding plate 4 and the intermediate bearing 12 being contiguous to the bearing 10. By this construction an ample support is afforded for all parts of the work-holding plate 4 and great rigidity is assured, it being important that the work held upon the device should not yield when subjected to the action of the cutting-tool.

It will be observed that the work-holding and base plates 1 and 4 are hinged back to back and that the work-holding plate may be turned to a position at right angles with the base-plate 1 at either side of the latter, one such position being shown in full lines in the drawings. Hence a piece of work that is clamped upon said work-holding plate may be planed upon its top and bottom edges by simply planing one edge, turning the work-holding plate over to the other side, and then planing the other edge of the work, and said edges will be exactly parallel. This may be done without taking the work off from the work-holder or removing the latter from the machine or even disturbing its position. It will also be seen at Fig. 3 by the dotted outline that the work-holding plate may be turned into parallelism with the bed or base-plate 1, and hence a cut may be taken upon the work that will be at exact right angles with the said edge cuts.

In order to enable the greatest degree of accuracy of adjustment, an index 14 may be provided upon the work-holding plate and a curved scale 15 upon the base-plate 1, said scale being preferably marked along the edge of a sector 16, that forms an extension of the bearing 11, said sector being preferably cast in one piece with the base-plate 1. The principal function of the sector, however, is to enable the work-holding plate 4 to be fastened at any angle to which it may be turned, and to this end said sector is provided with a curved slot 17 concentric with the hinge-pintle 7, and a bolt 18, Fig. 1, projects from the bearing 8 through said slot and carries a handle-nut 19, whereby the sector and the bearing 8 are clamped together when desired. Preferably an additional sector 20 is provided at the opposite end of the base upon the bearing 13, the bearing 9 being provided with locking-bolt 21 and handle-nut 22 to correspond with a curved slot similar to 17, formed in the sector 20. It will be understood that by clamping the hinged members together at both ends a very high degree of rigidity may be secured. The outer faces of the bearings 8 and 9 of the work-holding plate 4 have bearings against the inner faces of the sectors, thus giving an extensive clamping-surface, and, if desired, the edges or peripheries of the sectors may be finished concentrically with the hinge-pintle 7 to fit concave bearing-surfaces 23, formed upon the members 8 and 9, thereby giving additional support to the work-holding plate.

Upon a projecting end of the pintle or shaft 7 is preferably secured a worm wheel or gear 24, with which meshes a worm 25, the latter being fixed upon a shaft 26, mounted in bearings 27 28 and provided with a squared end 29 to fit a key, whereby fine adjustments of the work-holding plate may be effected. The bearing 27 is adjustably secured upon the outer face of the bearing 11, so that the worm-shaft 26 may be adjusted up or down to effect an accurate fit between the worm and worm-wheel. After adjustment of said bearing 27 it is secured by means of bolts 30.

In operation the base-plate 1 may be secured upon the bed of the machine by the employment of ordinary clamps. The handle-nuts are loosened to release the work-holding plate 4, and the shaft 26 is then rotated in either direction to turn the work-holding plate in the required direction to reach the desired position or angle, which may be determined by consulting the scale and index. The handle-nuts are then tightened. The work may be secured upon the work-holding plate either before or after adjustment of the latter by ordinary devices. When it is desired to make a cylindrical cut, the hand-nuts are not clamped; but the work-holder plate 4 is kept under control by means of the key that is fitted on the squared end 29 of the worm-shaft. The cutting-tool operates in the usual manner; but after each cut the operator turns the worm a trifle, thereby effecting a slight rotation of the work-holding plate, together with the work thereon, so that gradually a cylindrical cut is made. The worm and worm-wheel are sufficient to hold the work-holding plate properly for such work and in other cases also, if required, although generally the additional fastening devices described will be found of great advantage. In making a cylindrical cut the axis 7 of the work-holder is of course placed parallel with the path of the cutting-tool, and the cut that is made is of course concentric to said axis 7. In making a tapering cut, however, the axis 7 is set to a suitable angle with the path of the cutting-tool. By simply rotating the work-holding plate as the cuts are made a tapering cut may be made with facility.

Heretofore when it has been desired to machine a piece of work in parallelism with the base of the work-holding attachment it has been necessary after securing the attachment upon the planing-machine to employ a suitable instrument to compare the opposite sides of the work-holding plate to see if they were at equal distances from the bed of the planing-machine, and if found not to be true it has been necessary to loosen the work-holding plate, reset it, resecure it, and remeasure it, this train of operations being repeated until the work-holding plate is trued. By our invention, however, it is only necessary to turn the crank-shaft 26 until the index 14 points to the top graduation on the scale and then turn the clamps 19 22.

It will be seen that a piece of work in rough condition may be secured upon the work-holder and machined angularly upon its edges and shaped upon its top portion either flat, cylindrical, or tapering, and all without taking the work off from the work-holder, which is a great advantage. At the same time the work produced is true in every way, while the various adjustments may be made quickly and with precision and without repeated trials.

Variations may be resorted to within the scope of the invention—as, for instance, the sectors may be mounted or cast upon the work-holding plate and the bolts and handle-nuts secured to the bed, and portions of the improvements may be used without others—as, for instance, the rib or tongue 3 may be omitted, especially if it is desired to set the work-holder at odd angles upon the bed of the machine.

Having thus described our invention, we claim—

1. A work-holding attachment comprising two plates hinged back to back, one of said plates being provided with work-holding means and being broader than the other, and being movable upon the hinge to a position alongside of the other upon either side thereof, in which position the edge of the work-holding plate is flush with the bottom surface of the other plate; and means for fastening the work-holding plate where adjusted; whereby the position of the work-holding plate for making right-angle cuts upon either side of the work may be mechanically determined by setting said plate with either edge down upon the bed of the machine.

2. A work-holding attachment comprising two plates hinged back to back, one of said plates being provided with work-holding means and being broader than the other, and being movable upon the hinge to a position alongside of the other upon either side thereof, in which position the edge of the work-holding plate is flush with the bottom surface of the other plate; means for fastening the work-holding plate where adjusted; and micrometer mechanism, including a worm and screw, for adjusting said work-holding plate.

ADAM FERTIG.
RICHARD T. KNOLL.

Witnesses:
EDWARD A. McCUE,
ABNER B. STUPEL.